April 7, 1959   F. W. SCHWINN   2,880,783
WHEEL CHAIR COMMODE SEATS
Filed Feb. 15, 1956
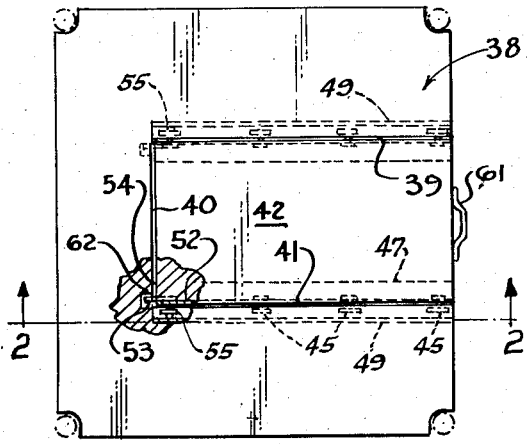
FIG. 1
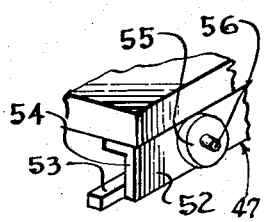
FIG. 5
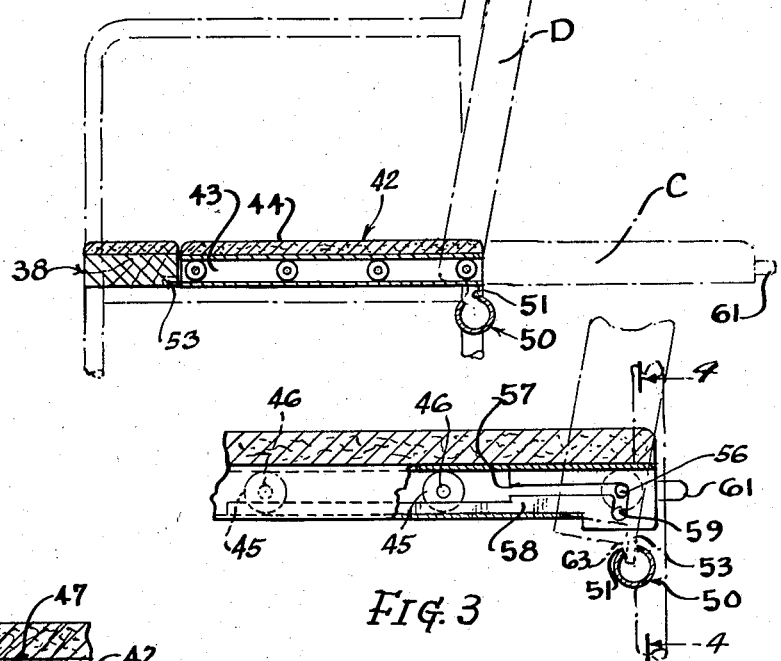
FIG. 2
FIG. 3
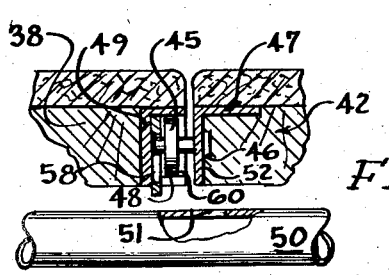
FIG. 4
INVENTOR.
Frank W. Schwinn
BY
Attorney

United States Patent Office 2,880,783
Patented Apr. 7, 1959

2,880,783

WHEEL CHAIR COMMODE SEATS

Frank W. Schwinn, Chicago, Ill.

Application February 15, 1956, Serial No. 565,628

3 Claims. (Cl. 155—31)

This invention relates to a wheel chair commode seat which may be readily manipulated by the occupant of the chair.

The difficulty and expense of securing adequate nursing help for invalids makes desirable the provision of patient-manipulated mechanical aids for the comforts and needs of a patient wherever possible. It is accordingly among the objects of this invention to provide a wheel chair which the occupant need not leave in order to take care of his bodily needs.

Another of the more general objects of this invention is the provision of a wheel chair commode seat which is inexpensive to build, simple to operate and which will not readily get out of order.

A more specific object of this invention is the provision of a commode seat having a central panel which is removable by a sliding and a rotary movement about a hinge, the panel being directly operable by a handle readily reached by the occupant of the commode seat.

As a still more specific object this invention has within its purview the provision of a commode seat having a U-shaped fixed supporting platform between the open sides of which is supported a panel which may be slid and rotated out of the way, the U-shaped section providing support for the occupant while the panel is being manipulated.

A feature of this invention is the provision of a slidable panel in a commode seat, with means for locking the panel in an inclined position after it has been slid out of the way, whereby the panel may be used as an additional backrest.

These and other objects and features of this invention will become apparent from the following detailed description when taken together with the accompanying drawings in which, Fig. 1 is a plan view of a commode seat made in accordance with this invention;

Fig. 2 is a side elevational view, in section, of the commode seat of Fig. 1, the section being taken along line 2—2 of the seat of Fig. 1;

Fig. 3 is an enlarged fragmentary side elevational view in section of the seat of Fig. 2 showing the details of construction of the guide for the supporting rollers of the seat;

Fig. 4 is a fragmentary enlarged rear elevational view in section of the portion of the seat of Fig. 3; and Fig. 5 is a perspective view of a fragmentary portion of the seat of Fig. 1.

It being within the purview of this invention to use the seat shown in Figs. 1 to 5, inclusive, with chairs of known construction, either with or without wheels, the details of the chair to which such seats may be applied are not shown and will not be described herein, nor will the specific means be described by which the seat is mounted on or secured to the frame of the chair.

Having reference to Figs. 1 to 5 inclusive, of the drawings, the seat is comprised of a platform 38 which is U-shaped, with the open end of the U at the right hand side thereof as viewed in Fig. 1. The opening formed by the interior of the U is defined by the interior walls 39, 40 and 41 of the platform. A panel 42 having substantially the same configuration as the opening defined by the interior walls 39, 40 and 41 is disposed in said opening and is substantially coplanar with the platform. The panel 42 may be made of substantially the same material as the platform and, assuming that the material selected is wood, may comprise a section of wood 43 upon which is secured a layer of soft padding 44 the upper surface of which is substantially level with the upper surface of platform 38.

Panel 42 is supported from platform 38 by a plurality of rollers 45 (Fig. 4) mounted on pins 46 extending outwardly from the sides of panel 42 toward the adjacent sides 39 and 41 of the platform. Pins 46 are mounted in angle irons 47 which are secured to, and preferably extend along the sides of, panel 42 adjacent sides 39 and 41 of platform 38. Rollers 45 ride on the lower interior surface 48 of channel irons 49 appropriately secured to the interior sides 39 and 41 of platform 38 with the open side of each channel facing the adjacent sides of panel 42. Said channels 49 are coextensive with sides 39 and 41, thereby providing continuous support for the rollers 45.

It is contemplated that panel 42 will be slid backward to the dotted position shown at C in Fig. 2 and then will be raised to the position shown in dotted outline at D in that figure. It is contemplated further that while in the raised position, it will be locked so that no further attention need be paid to it until it is desired to restore the panel to its original position. The locking means for the panel will now be described.

Extending transversely along the rear of the platform and constituting a cross brace for the chair is a tube 50 having an opening 51 disposed in the upper surface thereof in substantial alignment with the vertical leg 52 of each angle iron 47. As shown in Fig. 4 the forward portion of the vertical leg 52 of each side has a rectangular bar 53 secured to the inner surface thereof and projecting outwardly of the forward edge 54 of the angle iron. The forward roller 55 has a projection 56 which may be the end of pin 46 extending therethrough and which is adapted to enter a slot 57 (Fig. 3) in a plate 58 secured to the vertical interior surface of channel 49. Slot 57 is L-shaped in vertical section and thus has a downwardly extending leg 59, plate 58 being enlarged at the rear end thereof and projecting downwardly through a notch 60 in the lower horizontal wall of channel 49 to provide the necessary material for the formation of the slot.

It may be observed that channel 49 is cut away at the lower rear portion thereof and hence support for roller 45 is removed over the portion of the channel adjacent notch 60 so that said roller may be moved transversely of channel 49, thereby enabling the panel 42 to be lowered toward the tube 50. Thus, when panel 42 has been moved backwardly to the position C and then turned to the position D, it may thereafter be lowered until the bars 53 on each side of panel 42 enter their corresponding openings 51 in tube 50 and thus interlock the panel between tube 50 and plate 58. Support is given each extension 56 by the parallel walls of the lower leg 59 of slots 57. It may be observed further that during the last portion of the movement of panel 42 to the position shown in figure C, the panel may be supported by its front edge 63 resting directly upon tube 50 rather than by the rollers 45.

For ease in manipulating panel 42, a handle 61 is provided at the rear edge thereof and the back of the chair is open over that portion which would normally overlie panel 42 in its raised position, that is, in position C in Fig. 2. It is also contemplated that the interior side 40 of platform 38 will be formed with suitable recesses 62 into which the projecting ends of the bars 53 may extend when panel 42 is in the position shown in Fig. 1.

The particular construction of the chair with which the platform and panel of Figs. 1 to 5 inclusive are used is immaterial to this invention, except as noted above, and the chair may be of a fixed nature or foldable and it may be mounted on wheels to allow of self-propulsion by the occupant.

It is understood that the foregoing description is merely illustrative of preferred embodiments of the invention and that the scope of the invention is not to be limited thereto but is to be determined by the appended claims.

I claim:

1. A commode seat having a supporting frame and comprising a planar U-shaped platform, a panel adapted to fill the space between the sides of the U, means on the platform for supporting the panel in a position to fill the space between the sides of the U, and means for supporting the panel on the platform in a position angularly related to the plane of the platform, said first-mentioned supporting means comprising tracks on the platform in proximity to the panel, rollers on the panel engaging the tracks and supporting the panel from the tracks, pins extending concentrically along the axes of the rollers at one end of the panel, a transverse frame member secured to said supporting frame and disposed in proximity to the rear of the seat, and means for interlocking the panel and member, with the panel in inclined position relative to the platform, said interlocking means including slotted side plates adjacent the rollers, said pins extending into said slots and supporting in part the panel in its inclined position.

2. A commode seat comprising a planar U-shaped platform, a panel adapted to fill the space between the sides of the U, means on the platform for supporting the panel in a position to fill the space between the sides of the U, and means for supporting the panel on the platform in a position angularly related to the plane of the platform, said first-mentioned supporting means comprising tracks on the platform in proximity to the panel, roller means on the panel engaging the tracks and supporting the panel from the tracks, guides adjacent the sides of the panel and having a horizontal slot terminating in a substantially vertical slot, and pin means on the roller means, at one end of the panel and received in the slots, said slots being adapted to guide movement of the panel means in a horizontal and then a substantially vertical direction.

3. A commode seat having a supporting panel and comprising a planar U-shaped platform, a panel adapted to fill the space between the sides of the U, means on the platform for supporting the panel in a position to fill the space between the sides of the U, and means for supporting the panel on the platform in a position angularly related to the plane of the platform, said first-mentioned supporting means comprising tracks on the platform in proximity to the panel, roller means on the panel engaging the tracks and supporting the panel from the tracks, a transverse frame member secured to said supporting frame and disposed below the rear of the seat, guides adjacent the sides of the panel and having a horizontal slot terminating in a substantially vertical slot, pins on the roller means at the front end of the panel and received in the slots, said slots being adapted to guide movement of the panel means in a horizontal and then substantially vertical direction, and means for interlocking the panel and member with the panel in said angularly related position.

References Cited in the file of this patent

UNITED STATES PATENTS

| | | |
|---|---|---|
| 57,340 | Latta | Aug. 21, 1866 |
| 188,699 | Van Court | Mar. 20, 1877 |
| 370,557 | Petersen | Sept. 27, 1887 |
| 1,117,338 | Cox | Nov. 17, 1914 |
| 1,691,620 | Wilson | Nov. 13, 1928 |
| 2,086,550 | Hartig | July 13, 1937 |
| 2,607,926 | De Puy | Aug. 26, 1952 |

FOREIGN PATENTS

| | | |
|---|---|---|
| 8,662 | Sweden | Jan. 15, 1898 |